United States Patent
Shiraga (10) Patent No.: US 7,139,919 B2
(45) Date of Patent: Nov. 21, 2006

(54) INFORMATION PROCESSING APPARATUS WITH CENTRAL PROCESSING UNIT AND MAIN MEMORY HAVING POWER SAVING MODE, AND POWER SAVING CONTROLLING METHOD

(75) Inventor: Shinji Shiraga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 09/931,887

(22) Filed: Aug. 20, 2001

(65) Prior Publication Data

US 2002/0026601 A1    Feb. 28, 2002

(30) Foreign Application Priority Data

Aug. 22, 2000    (JP)    ............................. 2000/251221
Jun. 19, 2001    (JP)    ............................. 2001/184981

(51) Int. Cl.
    *G06F 1/26*    (2006.01)
    *G11C 5/14*    (2006.01)
(52) U.S. Cl. ..................... 713/300; 713/320; 365/227
(58) Field of Classification Search ................ 713/300, 713/320, 323, 324, 330; 711/106; 365/222, 365/227
See application file for complete search history.

(56) References Cited

U.S. PATENT DOCUMENTS

| | | | | |
|---|---|---|---|---|
| 5,671,366 A | | 9/1997 | Niwa et al. ................ | 395/281 |
| 5,721,835 A | | 2/1998 | Niwa et al. ................ | 395/281 |
| 5,754,557 A | * | 5/1998 | Andrewartha ............... | 714/718 |
| 5,931,951 A | * | 8/1999 | Ando ........................ | 713/324 |
| 6,128,747 A | * | 10/2000 | Thoulon .................... | 713/330 |
| 6,151,262 A | * | 11/2000 | Haroun et al. ............. | 365/227 |
| 6,292,869 B1 | * | 9/2001 | Gerchman et al. ......... | 711/106 |
| 6,334,167 B1 | * | 12/2001 | Gerchman et al. ......... | 711/106 |

FOREIGN PATENT DOCUMENTS

JP    07154515 A    *    6/1995

* cited by examiner

*Primary Examiner*—Thomas Lee
*Assistant Examiner*—Suresh K Suryawanshi
(74) *Attorney, Agent, or Firm*—Fitzpatrick, Cella, Harper & Scinto (57) ABSTRACT

A power saving type information processing apparatus is provided which is not expensive and can provide a high interruption performance without using an expensive and dedicated memory and a complicated software process. After an SDRAM setting register of an SDRAM controller outputs a SELF allowance signal for allowing SDRAM to transfer to a power saving mode from a normal operation mode, a WAITI command fetch detecting circuit outputs a WAITI command detecting signal. In this case, SDRAM is made to transfer to the power saving mode. If a CPU detects an external interruption while SDRAM is in the power saving mode, SDRAM is returned to the normal operation mode irrespective of settings of the SDRAM setting register.

12 Claims, 7 Drawing Sheets

INFORMATION PROCESSING APPARATUS WITH CENTRAL PROCESSING UNIT AND MAIN MEMORY HAVING POWER SAVING MODE, AND POWER SAVING CONTROLLING METHOD

BACKGROUND OF THE INVENTION

1. Field of the Invention

The present invention relates to an information processing apparatus, a power saving controlling method and a storage medium, and more particularly to an information processing apparatus with a central processing unit and a main memory having a power saving mode, a power saving controlling method and a storage medium.

2. Description of the Related Art

Power saving type CPU's have been widely used in information processing apparatus having a power saving mode and a normal operation mode wherein the power saving mode is activated when a power saving mode transfer command (WAITI command) is executed and the operation mode is returned to the normal operation mode when a hardware interruption is input. In order to reduce a power consumption of the whole apparatus, a power saving mode is used for each of the constituent element of the system, and the power saving mode is activated for each constituent element not used during the operation of the apparatus.

A main memory for storing programs and data to be used by a CPU is a constituent element which consumes a large power. Various power saving modes for the main memory have been proposed. For example, the operation mode of a main memory using a synchronous DRAM (SDRAM) can be switched to a power saving mode by issuing a self refresh entry command (SELF command) to SDRAM.

Switching to such power saving mode is generally performed by the settings of CPU. In order to make the whole apparatus transfers to the power saving mode, first the main memory is required to transfer to the power saving mode by setting with CPU and then CPU itself is required to transfer to the power saving mode. However, in order for CPU itself to transfer to the power saving mode, it is necessary to execute a WAITI command. This WAITI command is generally stored in the main memory so that the main memory is required to be in the normal operation mode when the WAITI command is fetched.

When the operation mode is to be returned to the normal operation mode from the power saving mode by a hardware interruption, it is necessary for CPU first to make settings so that the main memory can recover the normal operation mode. However, immediately after CPU returns to the normal operation mode, CPU fetches a command for an interruption handler from the main memory. It is necessary that the main memory is in the normal operation mode at this time.

In order to satisfy the above-described requirements, in conventional arts, the main memory is divided into a static memory having a small capacity and a low consumption power such as a ROM and an SRAM, and an SDRAM having a large capacity. A routine for executing the WAITI command and an interruption handler are made always resident in the small capacity memory or they are transferred to the small capacity memory immediately before the transfer to the power saving mode.

In the information processing apparatus, it is generally necessary for CPU to fetch a command at a reset vector address immediately after the power is turned on. From this reason, the apparatus is provided with an inexpensive ROM (boot ROM) as a portion of the main memory. In a partial field of the boot ROM, the execution routine for the WAITI command and the interruption handler are fixedly written beforehand to configure the apparatus without providing a dedicated memory to the transfer to the power saving mode. Alternatively, if a CPU has a command cache, the operation mode is transferred to the power saving mode after the execution routine for the WAITI command and the interruption handler are locked down in the command cache. Namely, instead of using a dedicated SRAM, the command cache is used for the same purpose.

The above-conventional arts are, however, associated with the following problems. An inexpensive ROM has a longer access time than a RAM. Therefore, a command sequence in ROM is processed slower than a command sequence in RAM. If the interruption handler is fixedly written in ROM, not only a process regarding the transfer from the power saving mode but also a process regarding a usual interruption process becomes slow. This problem is critical for information processing apparatus, particularly those performing a real time process.

An approach to providing a dedicated SRAM results in a rise of the apparatus cost because of expensive SRAM.

An approach to utilizing a command cache results in a large process overhead and a low process speed, because each time the operation mode transfers to the power saving mode, a necessary routine or handler is locked down in the cache by using a specific cache operation command. Further, software for handling the cache is likely to become complicated and debugging is difficult. Locking down in the cache means a substantial reduction of the field for storing other commands, which results in a lower hit rate of the cache and a lower performance.

SUMMARY OF THE INVENTION

The present invention has been made in consideration of the above-described problems. It is an object of the present invention to provide a power saving type information processing apparatus which is not expensive and can provide a high interruption performance without using an expensive and dedicated memory and a complicated software process, a power saving controlling method and a storage medium storing a program for realizing such method.

In order to achieve the above object, the invention provides an information processing apparatus comprising: central processing means capable of transferring from a normal operation mode to a power saving mode and returning from the power saving mode to the normal operation mode; main memory means capable of transferring from the normal operation mode to the power saving mode and returning from the power saving mode to the normal operation mode; and setting means for setting transfer information of the main memory means from the normal operation mode to the power saving mode, wherein after the transfer information is set by the setting means, the central processing means executes a power saving mode transfer command.

The invention also provides an information processing apparatus comprising: central processing means having a normal operation mode and a power saving mode; main memory means having the normal operation mode and the power saving mode; storage means for storing transfer information of the main memory means from the normal operation mode to the power saving mode; detecting means for detecting a power saving mode transfer command sent to the central processing means; and transfer control means for making the main memory means transfer to the power saving mode from the normal operation mode in accordance with the transfer information stored in the storage means and a detection by the detecting means.

The invention also provides a power saving controlling method for an information processing apparatus having a central processing unit capable of transferring from a normal operation mode to a power saving mode and returning to the power saving mode to the normal operation mode and a main memory capable of transferring from the normal operation mode to the power saving mode and returning to the power saving mode to the normal operation mode, the method comprising: a setting step of setting transfer information of the main memory from the normal operation mode to the power saving mode; and an executing step of the central processing unit executing a power saving mode transfer command after the transfer information is set by the setting step.

The invention also provides a power saving controlling method for an information processing apparatus having a central processing unit having a normal operation mode and a power saving mode and a main memory having the normal operation mode and the power saving mode, the method comprising: a storing step of storing transfer information of the main memory from the normal operation mode to the power saving mode; a detecting step of detecting a power saving mode transfer command sent to the central processing unit; and a transfer control step of making the main memory transfer to the power saving mode from the normal operation mode in accordance with the transfer information stored by the storing step and a detection by the detecting step.

DETAILED DESCRIPTION OF THE PREFERRED EMBODIMENTS

Embodiments of the invention will be described in detail with reference to the accompanying drawings.

First Embodiment

Figure 1:
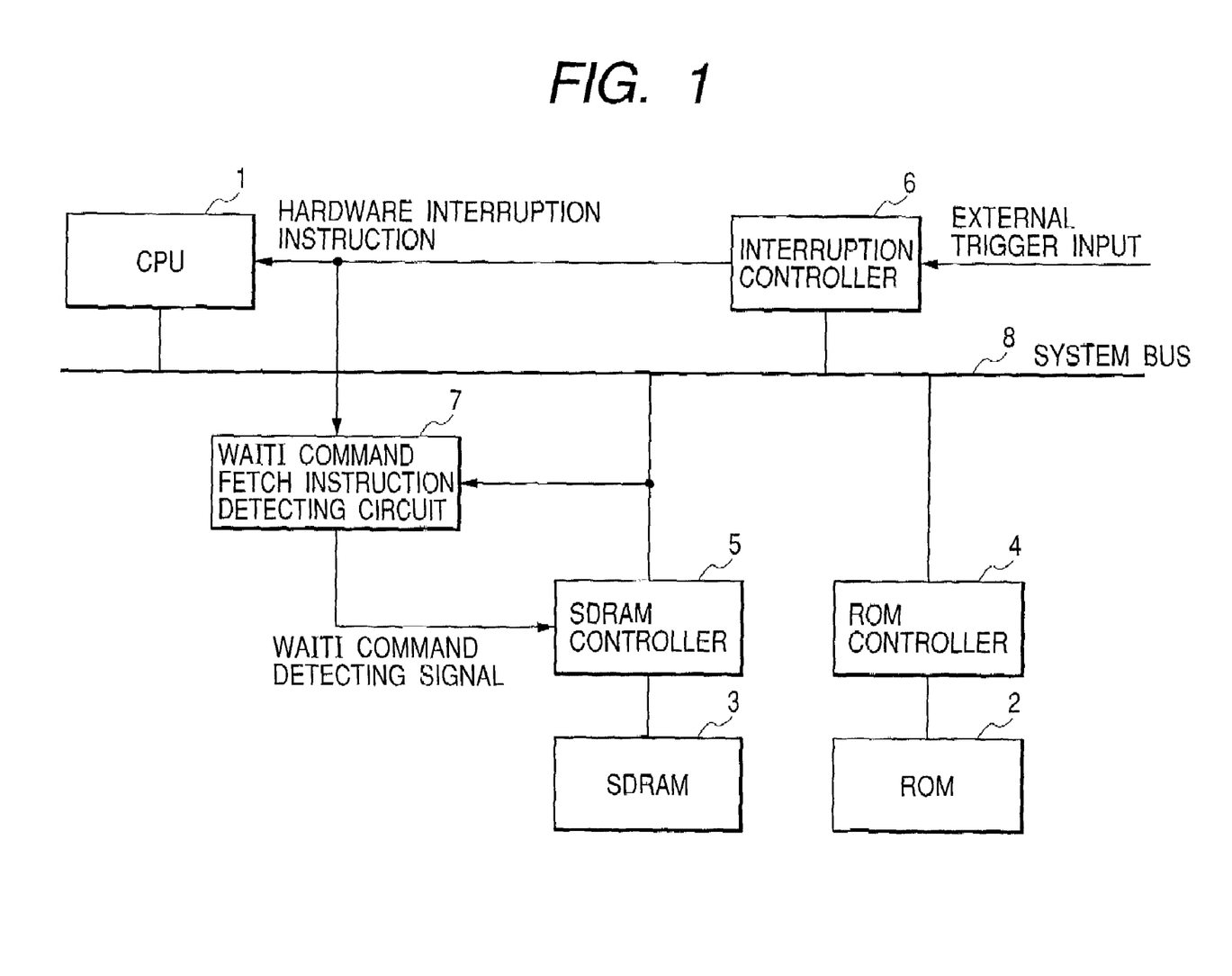
FIG. 1 is a block diagram showing the electronic structure of an information processing apparatus according to a first embodiment of the invention.

FIG. 1 is a block diagram showing the electronic structure of an information processing apparatus according to the first embodiment of the invention. The information processing apparatus according to the first embodiment of the invention has a Central Processing Unit (CPU) 1, a ROM 2, an SDRAM (main memory) 3, a ROM controller 4, an SDRAM controller 5, an interruption controller 6, a WAITI command fetch detecting circuit 7, and a system bus 8.

This structure will be detailed. CPU 1 is a power saving type central processing unit which executes a power saving mode transfer command (WAITI command) to transfer to the power saving mode and returns to the normal operation mode upon reception of a hardware interruption. Commands to be executed by CPU 1 are stored in ROM 2 and SDRAM 3. SDRAM 3 also stores data necessary for the command execution by CPU 1. A command fetch/transfer of CPU 1 is generated as a transaction on the system bus 8. Upon detection of this transaction, the ROM controller 4 or SDRAM controller 5 converts it into a memory access/transfer and an accessed command in ROM 2 or SDRAM 3 is sent to the system bus 8. Similarly, data transfer by CPU 1 is also performed by the SDRAM controller 5 via the system bus 8.

Upon reception of an external trigger such as a switch depression of the information processing apparatus, the interruption controller 6 asserts a hardware interruption signal relative to CPU 1 and WAITI command fetch detecting circuit 7. The WAITI command fetch detecting circuit 7 monitors a command fetch/transfer on the system bus 8. When the WAITI command fetch detecting circuit 7 detects that the transfer on the system bus is the command fetch transfer and data is the WAITI command, the circuit 7 asserts a WAITI command detecting signal relative to the SDRAM controller 5. When a hardware interruption signal is asserted, the WAITI command detecting signal is negated.

Figure 2:
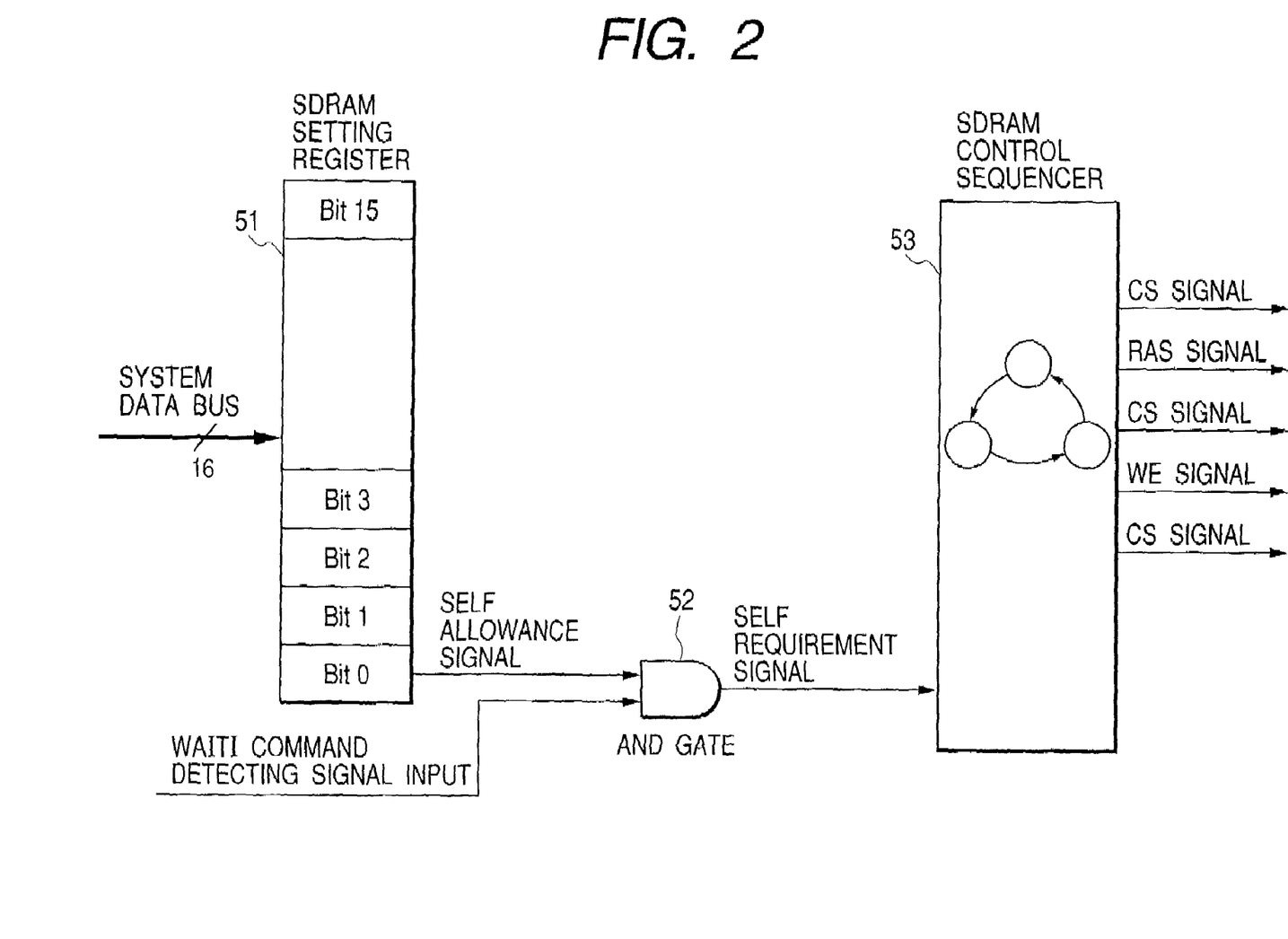
FIG. 2 is a block diagram showing the internal structure of an SDRAM controller of the information processing apparatus of the first embodiment.

FIG. 2 is a block diagram illustrating settings of the power saving mode by the SDRAM controller 5 of the information processing apparatus of the first embodiment shown in FIG. 1. The SDRAM controller 5 of the information processing apparatus of the first embodiment has an SDRAM setting register (setting means) 51, an AND gate 52 and an SDRAM control sequencer 53.

The structure of the SDRAM controller 5 will be detailed. The SDRAM setting register 51 is, for example, a 16-bit register connected to 16-bit data lines of the system bus 8. This SDRAM setting register 51 is memory-mapped as viewed from CPU 1, and for example, assigned with an address of 0×FF100000. A decode circuit (not shown) of the SDRAM controller 5 decodes the address lines of the system bus 8, and if the address of the transaction output from CPU 1 is the address 0×FF100000 and the transaction is a write transaction, data on the data lines of the system bus 8 is latched to the SDRAM setting register 51.

The lowest bit (Bit 0) of the SDRAM setting register 51 is output as a SELF allowance signal to one input terminal of the two-input AND gate 52. To the other input terminal of the AND gate 52, a WAITI command detecting signal is input which indicates that CPU 1 fetched the WAITI command. An output of the AND gate 52 is supplied as an SELF requirement signal to the SDRAM control sequencer 53.

When the SELF requirement signal is asserted as "1", the SDRAM control sequencer 53 issues a SELF command to SDRAM 3 immediately after the presently executing memory transfer is completed. This is realized by driving a CS signal, a RAS signal, a CAS signal and a CKE signal all to "0" and a WE signal to "1". Upon reception of the SELF command, SDRAM 3 transfers to the power saving mode.

Next, the operation of the information processing apparatus of the first embodiment constructed as above will be described in detail with reference to FIGS. 1 and 2. The control operation to be described in the following is executed by CPU 1 in accordance with the program stored in ROM 2 of the information processing apparatus.

First, a procedure of transferring both CPU 1 and SDRAM 3 to the power saving mode to be executed by CPU 1 will be described. CPU 1 issues a write and transfer to the SDRAM setting register 51 of the SDRAM controller 5 and drives the data line Bit 0 of the system bus 8 to "1" so that the SELF allowance signal is set to "1". At this time, the SDRAM controller 5 does not issue the SELF command immediately. It is therefore possible for CPU 1 to fetch the WAITI command from SDRAM 3, the WAITI command being a command to be executed last in the normal operation mode.

When CPU 1 issues a command fetch transfer for fetching the WAITI command to the system bus 8, the WAITI command fetch detecting circuit 7 asserts the WAITI command detecting signal as "1". As a result, the SELF requirement signal becomes "1" so that the SDRAM control sequencer 53 of the SDRAM controller 5 issues the SELF command to SDRAM 3 and SDRAM 3 enters the power saving mode.

Next, a procedure of returning to the normal operation mode from the power saving mode will be described. When an external trigger is input in response to the depression of a switch or the like of the information processing apparatus, the interruption controller 6 asserts a hardware interruption relative to CPU 1 and the WAITI command fetch detecting circuit 7. Upon reception of the interruption, CPU 1 returns to the normal operation mode and the WAITI command fetch detecting circuit 7 negates the WAITI command detecting signal to "0".

The SELF requirement signal of the SDRAM controller 5 is therefore negated so that the SDRAM control sequencer 53 of the SDRAM controller 5 immediately issues a SELF EXIT command to SDRAM 3. This is realized by driving only the CS signal to "0" and all other signals (RAS signal, CAS signal, WE signal and CKE signal) to "1". With the above operations, SDRAM 3 returns to the normal operation mode.

CPU 1 returned to the normal operation mode outputs an interruption vector address and a command fetch cycle to the system bus 8 in order to immediately fetch the interruption handler command. Since SDRAM 3 is already in the normal operation mode, the SDRAM controller 5 immediately reads the requested command from SDRAM 3 and outputs it to the system bus 8.

As described above, according to the first embodiment of the invention, in the information processing apparatus having CPU 1 capable of transferring to the power saving mode from the normal operation mode and returning to the normal operation mode from the power saving mode and SDRAM 3 capable of transferring to the power saving mode from the normal operation mode and returning to the normal operation mode from the power saving mode, the SDRAM setting register 51 of the SDRAM controller 5 outputs the SELF allowance signal for allowing SDRAM 3 to transfer to the power saving mode from the normal operation mode, and thereafter the WAITI command fetch detecting circuit 7 outputs the WAITI command detecting signal. In this case, SDRAM 3 is transferred to the power saving mode. When CPU 1 detects the external interruption for returning to the normal operation mode from the power saving mode while SDRAM 3 is in the power saving mode, the operation mode of SDRAM 3 is returned to the normal operation mode irrespective of settings of the SDRAM setting register 51. Accordingly, the following advantageous effects can be obtained.

SDRAM 3 can operate normally when the WAITI command is fetched to transfer to the power saving mode, without using an expensive dedicated memory and a complicated software process, because SDRAM 3 is transferred to the power saving mode after CPU 1 reliably transfers to the power saving mode. Further, SDRAM 3 can fetch the interruption handler command to return to the normal operation mode. Since the interruption handler can be made always resident in a high speed RAM without wastefully using the cache field, a high performance can be maintained and a complicated software process is not necessary. It is therefore easy to configure a power saving type information processing apparatus which is not expensive and has a high interruption performance.

Second Embodiment

Figure 3:
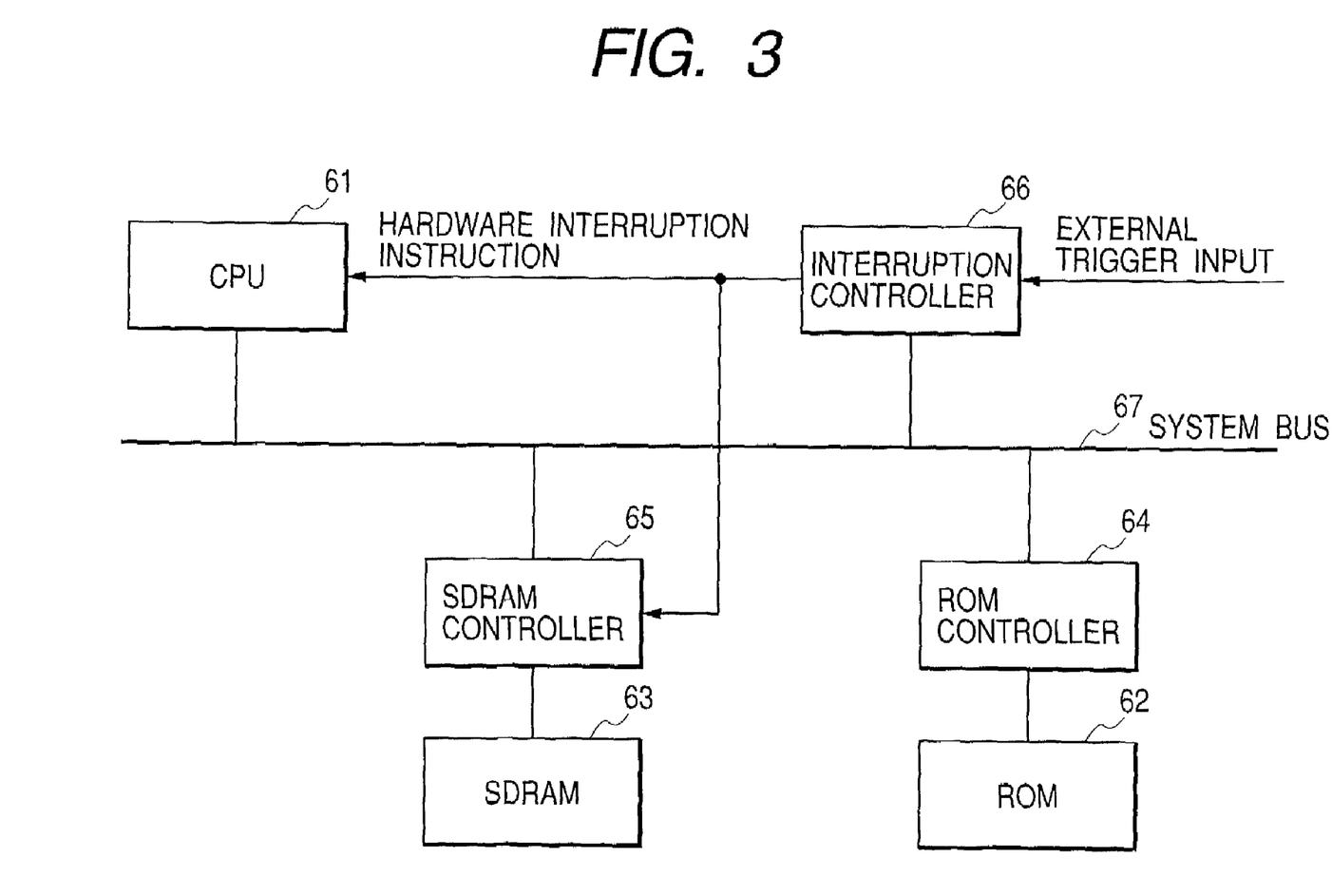
FIG. 3 is a block diagram showing the electronic structure of an information processing apparatus according to a second embodiment of the invention.

FIG. 3 is a block diagram showing the electronic structure of an information processing apparatus according to the second embodiment of the invention. The information processing apparatus according to the second embodiment of the invention has a Central Processing Unit (CPU) 61, a ROM 62, an SDRAM (main memory) 63, a ROM controller 64, an SDRAM controller 65, an interruption controller 66, and a system bus 67.

This structure will be detailed. CPU 61 is a power saving type central processing unit which executes a power saving mode transfer command (WAITI command) to transfer to the power saving mode and returns to the normal operation mode upon reception of a hardware interruption. Commands to be executed by CPU 61 are stored in ROM 62 and SDRAM 63. SDRAM 63 also stores data necessary for the command execution by CPU 61.

A command fetch/transfer of CPU 61 is generated as a transaction on the system bus 67. Upon detection of this transaction, the ROM controller 64 or SDRAM controller 65 converts it into a memory access/transfer and an accessed command in ROM 62 or SDRAM 63 is sent to the system bus 67. Similarly, data transfer by CPU 61 is also performed by the SDRAM controller 65 via the system bus 67. Upon reception of an external trigger such as a switch depression of the information processing apparatus, the interruption controller 66 asserts a hardware interruption signal relative to CPU 61 and SDRAM controller 65.

Figure 4:
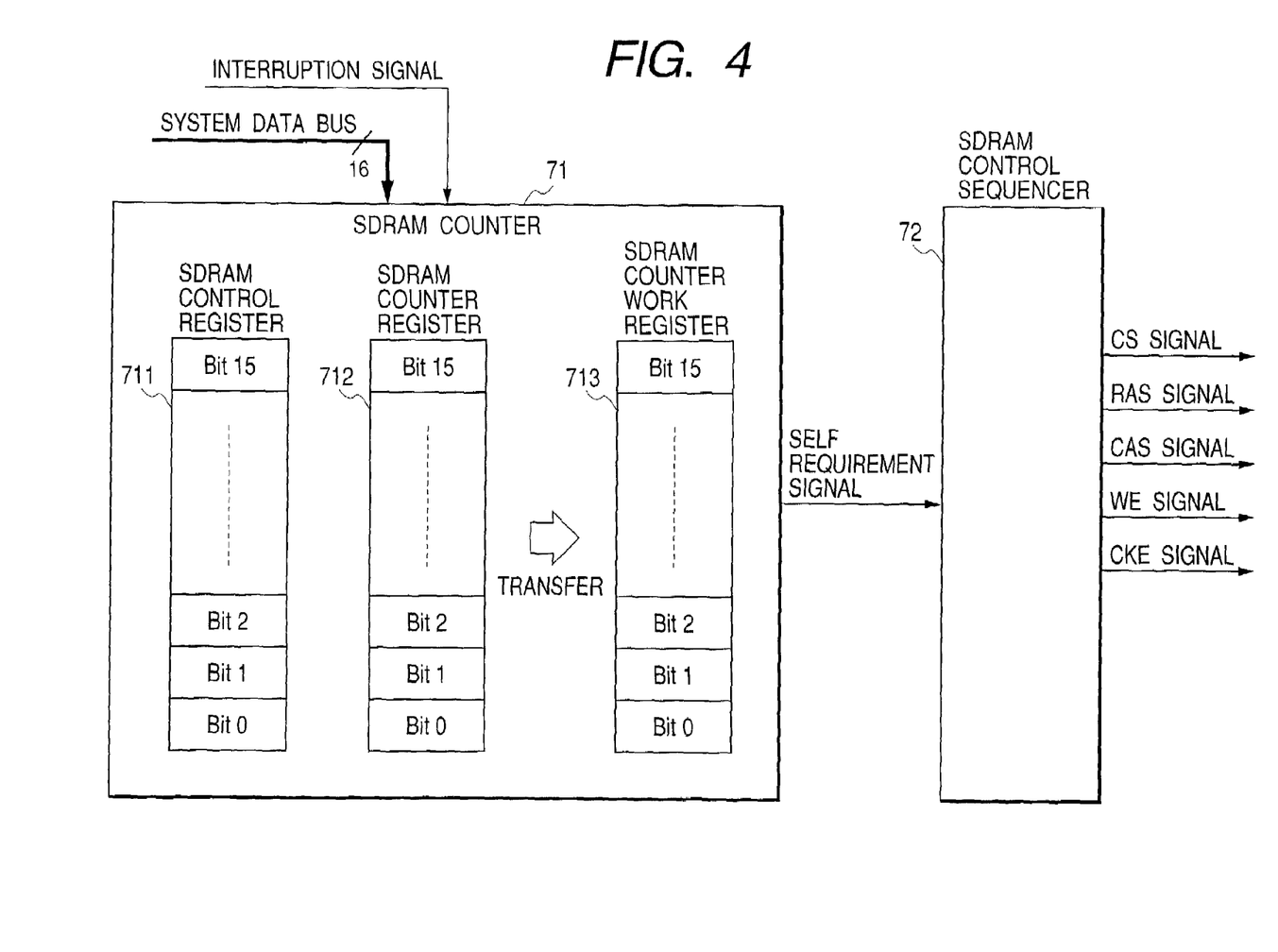
FIG. 4 is a block diagram showing the internal structure of an SDRAM controller of the information processing apparatus of the second embodiment.

FIG. 4 is a block diagram illustrating settings of the power saving mode by the SDRAM controller 65 of the information processing apparatus of the second embodiment shown in FIG. 3. The SDRAM controller 65 of the information processing apparatus of the second embodiment has an SDRAM counter 71 and an SDRAM control sequencer 72, the SDRAM counter 71 including an SDRAM control register 711, an SDRAM counter register (time setting means) 712 and an SDRAM counter work register 713.

The structure of the SDRAM controller 65 will be detailed. The SDRAM control register 711, SDRAM counter register 712 and SDRAM counter work register 713 are, for example, a 16-bit register. Of these registers, the SDRAM control register 711 and SDRAM counter register 712 are connected to 16-bit data lines of the system bus 67. The SDRAM control register 711 and SDRAM counter register 712 are memory-mapped as viewed from CPU 61. For example, the SDRAM control register 711 is assigned with an address of 0xFF100000, whereas the SDRAM counter register 712 is assigned with an address of 0xFF100004.

If a transaction output from CPU 61 is a write transaction, a decode circuit (not shown) of the SDRAM controller 65 decodes the address lines of the system bus 67 and data is latched to the SDRAM control register 711 if the address is 0xFF100000 and to the SDRAM counter register 712 if the address is 0xFF100004.

When "1" is written to the lowest bit (Bit 0) of the SDRAM control register 711, the SDRAM counter 71 transfers the contents of the SDRAM counter register 712 to the SDRAM counter work resister 713. In response to a clock signal (now shown), the contents of the SDRAM counter work register 713 are counted down until all the bits become "0". Only when all the bits of the SDRAM counter work register 713 become "0" and the lowest bit (Bit 0) of the SDRAM control register 711 is "1", a SELF requirement signal connected to the SDRAM control sequencer 72 is set to "1". When the hardware interruption signal is asserted, the lowest bit (Bit 0) of the SDRAM control register 711 is reset to "0".

When the SELF requirement signal is asserted as "1", the SDRAM control sequencer 72 issues a SELF command to SDRAM 63 immediately after the presently executing memory transfer is completed. This is realized by driving a CS signal, a RAS signal, a CAS signal and a CKE signal all to "0" and a WE signal to "1". Upon reception of the SELF command, SDRAM 63 transfers to the power saving mode.

When the SELF requirement signal is negated to "0", the SDRAM control sequencer 72 immediately issues a SELF EXIT command to SDRAM 63. This is realized by driving only the CS signal to "0" and all the other signals (RAS signal, CAS signal, WE signal and CKE signal) to "1". SDRAM 63 therefore returns to the normal operation mode.

Next, the operation of the information processing apparatus of the second embodiment constructed as above will be described in detail with reference to FIGS. 3 and 4. The control operation to be described in the following is executed by CPU 61 in accordance with the program stored in ROM 62 of the information processing apparatus.

First, a procedure of transferring both CPU 61 and SDRAM 63 to the power saving mode to be executed by CPU 61 will be described. CPU 61 issues a write transfer to the address assigned to the SDRAM counter register 712 of the SDRAM controller 65 to set a time taken from the count-down start to the transfer to the power saving mode to the SDRAM counter register 712. Next, CPU 61 issues a write transfer to the address assigned to the SDRAM control register 711 to set "1" to the lowest bit (Bit 0) of the SDRAM control register 711. With the above operations, the SDRAM counter 71 transfers the contents of the SDRAM counter register 712 to the SDRAM work register 713 to start the count-down thereof.

Since the SELF requirement signal is not asserted to "1" until all the bits of the SDRAM counter work register 713 become "0", SDRAM 63 is in the normal operation mode at this time. During this period, CPU 61 executes the WAITI command for transferring CPU itself to the power saving mode. Thereafter, when all the bits of the SDRAM counter work register 713 become "0", the SELF requirement signal is asserted to "1" and the SDRAM control sequencer 72 issues the SELF command to SDRAM 63 to make SDRAM 63 enter the power saving mode.

Next, a procedure of returning to the normal operation mode from the power saving mode will be described. When an external trigger is input in response to the depression of a switch or the like of the information processing apparatus, the interruption controller 66 asserts a hardware interruption. Therefore, CPU 61 immediately returns to the normal operation mode, and the SDRAM counter 71 resets the lowest bit (Bit 0) of the SDRAM control register 711 to "0" and negates the SELF requirement signal to "0". The SDRAM control sequencer 72 immediately issues a SELF EXIT command to SDRAM 63 to make it enter the normal operation mode.

CPU 61 returned to the normal operation mode outputs an interruption vector address and a command fetch cycle to the system bus 67 in order to immediately fetch the interruption handler command. Since SDRAM 63 is already in the normal operation mode, the SDRAM controller 65 immediately reads the requested command from SDRAM 63 and outputs it to the system bus 67.

As described above, according to the second embodiment of the invention, in the information processing apparatus having CPU 61 capable of transferring to the power saving mode from the normal operation mode and returning to the normal operation mode from the power saving mode and SDRAM 63 capable of transferring to the power saving mode from the normal operation mode and returning to the normal operation mode from the power saving mode, CPU 61 sets the time taken to transfer to the power saving mode from the normal operation mode to SDRAM 63, and instructs SDRAM 63 to transfer to the power saving mode after a lapse of the set time. When SDRAM 63 receives this instruction, SDRAM 63 is controlled to transfer to the power saving mode after a lapse of the set time. Accordingly, the following advantageous effects can be obtained.

SDRAM 63 can operate normally when the WAITI command is fetched to transfer to the power saving mode, without using an expensive dedicated memory. Further, SDRAM 63 can fetch the interruption handler command to return to the normal operation mode. After the booting, the interruption handler and the like in ROM 62 are transferred to a high speed SDRAM 63. It is therefore possible to execute the interruption handler at high speed without wastefully using a cache field and the like and without using a complicated software process. It is therefore easy to configure a power saving type information processing apparatus which is not expensive and has a high interruption performance.

Third Embodiment

Figure 5:
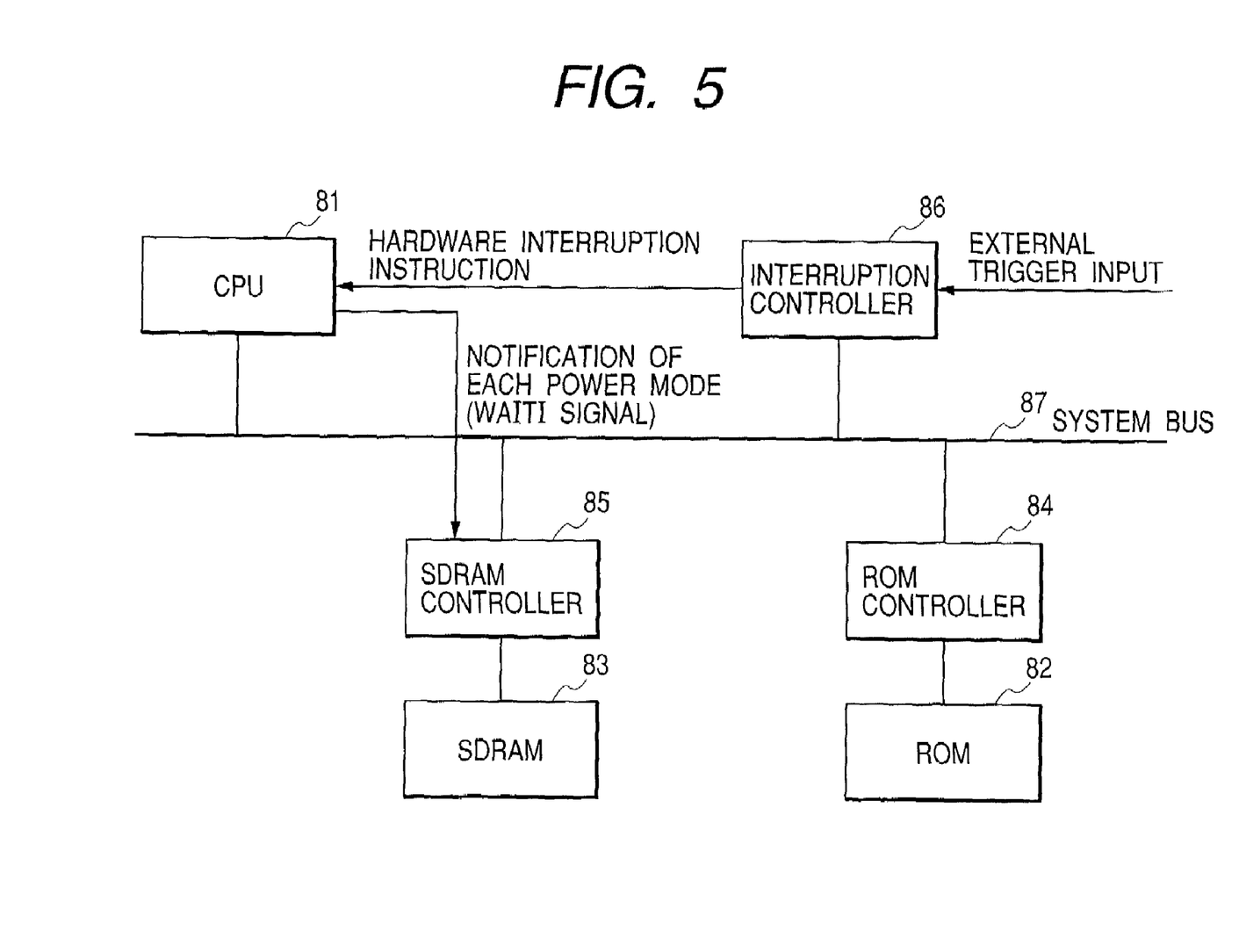
FIG. 5 is a block diagram showing the electronic structure of an information processing apparatus according to a third embodiment of the invention.

FIG. 5 is a block diagram showing the electronic structure of an information processing apparatus according to the third embodiment of the invention. The information processing apparatus according to the third embodiment of the invention has a Central Processing Unit (CPU) 81, a ROM 82, an SDRAM (main memory) 83, a ROM controller 84, an SDRAM controller 85, an interruption controller 86, and a system bus 87.

This structure will be detailed. CPU 81 is a power saving type central processing unit which executes a power saving mode transfer command (WAITI command) to transfer to the power saving mode and returns to the normal operation mode upon reception of a hardware interruption. Commands to be executed by CPU 81 are stored in ROM 82 and SDRAM 83. SDRAM 83 also stores data necessary for the command execution by CPU 81.

A command fetch/transfer of CPU 81 is generated as a transaction on the system bus 87. Upon detection of this transaction, the ROM controller 84 or SDRAM controller 85 converts it into a memory access/transfer and an accessed command in ROM 82 or SDRAM 83 is sent to the system bus 87. Similarly, data transfer by CPU 81 is also performed by the SDRAM controller 85 via the system bus 87. Upon reception of an external trigger such as a switch depression of the information processing apparatus, the interruption controller 86 asserts a hardware interruption signal relative to CPU 81.

Figure 6:
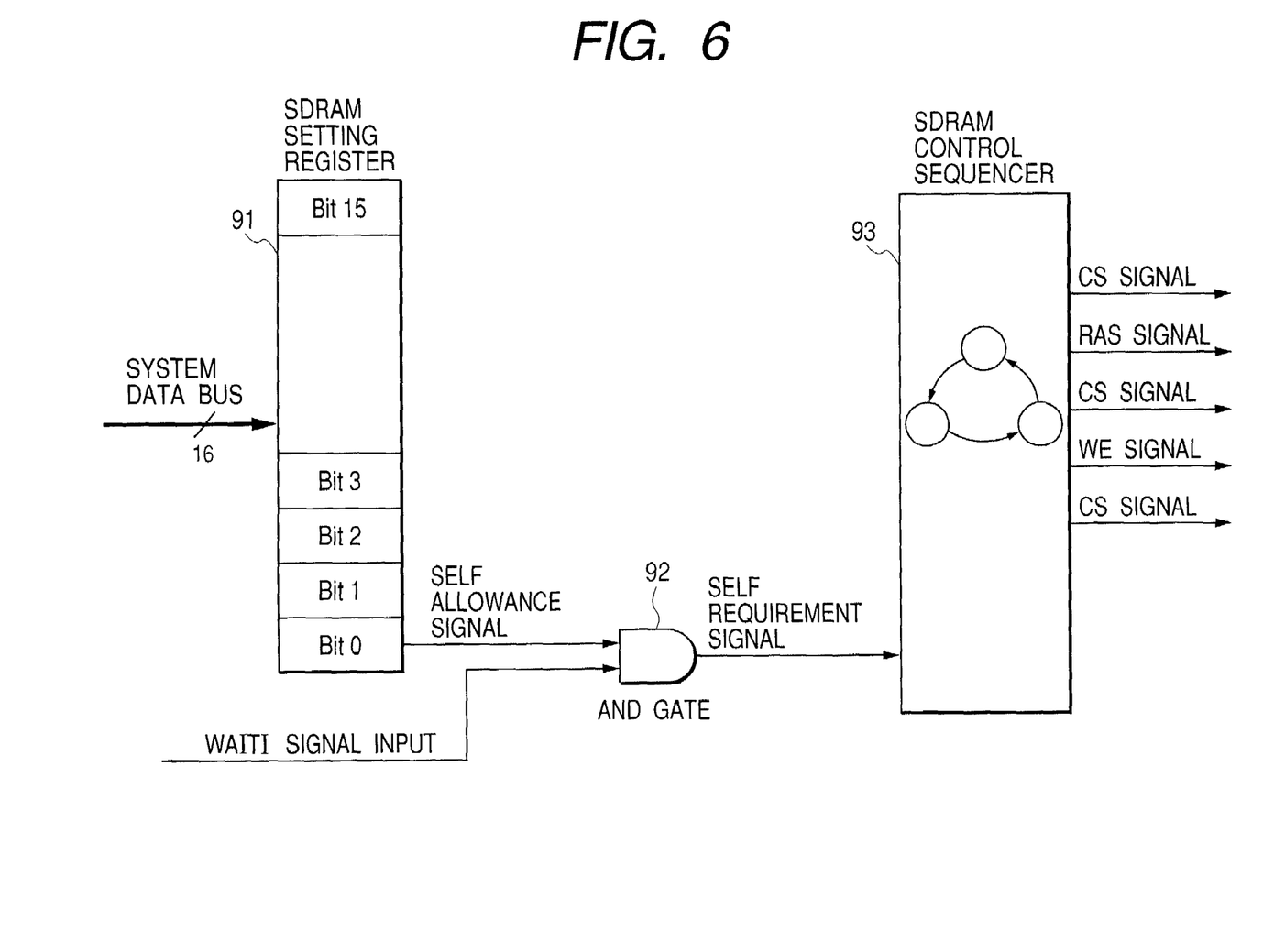
FIG. 6 is a block diagram showing the internal structure of an SDRAM controller of the information processing apparatus of the third embodiment.

FIG. 6 is a block diagram illustrating settings of the power saving mode by the SDRAM controller 85 of the information processing apparatus of the third embodiment shown in FIG. 5. The SDRAM controller 85 of the information processing apparatus of the third embodiment has an SDRAM setting register 91, an AND gate 92 and an SDRAM control sequencer 93.

The structure of the SDRAM controller 85 will be detailed. The SDRAM setting register 91 is, for example, a 16-bit register connected to 16-bit data lines of the system bus 87. This SDRAM setting register 91 is memory-mapped as viewed from CPU 81, and for example, assigned with an address of 0×FF100000. A decode circuit (not shown) of the SDRAM controller 85 decodes the address lines of the system bus 87, and if the address of the transaction output from CPU 81 is the address 0×FF100000 and the transaction is a write transaction, data on the data lines of the system bus 87 is latched to the SDRAM setting register 91.

The lowest bit (Bit 0) of the SDRAM setting register 91 is output as a SELF allowance signal to one input terminal of the two-input AND gate 92. To the other input terminal of the AND gate 92, a WAITI signal is input which indicates that CPU 81 transferred to the power saving mode. An output of the AND gate 92 is supplied as an SELF requirement signal to the SDRAM control sequencer 93.

When the SELF requirement signal is asserted as "1", the SDRAM control sequencer 93 issues a SELF command to SDRAM 8 immediately after the presently executing memory transfer is completed. This is realized by driving a CS signal, a RAS signal, a CAS signal and a CKE signal all to "0" and a WE signal to "2". Upon reception of the SELF command, SDRAM 83 transfers to the power saving mode.

Next, the operation of the information processing apparatus of the third embodiment constructed as above will be described in detail with reference to FIGS. 5 and 6. The control operation to be described in the following is executed by CPU 81 in accordance with the program stored in ROM 82 of the information processing apparatus.

First, a procedure of transferring both CPU 81 and SDRAM 83 to the power saving mode to be executed by CPU 81 will be described. CPU 81 issues a write transfer to the SDRAM setting register 91 of the SDRAM controller 85 and drives the data line Bit 0 of the system bus 87 to "1" so that the SELF allowance signal is set to "1". At this time, the SDRAM controller 85 does not issue the SELF command immediately. It is therefore possible for CPU 81 to fetch the WAITI command from SDRAM 83, the WAITI command being a command to be executed last in the normal operation mode.

When CPU 81 executes the WAITI command and completes the transfer to the power saving mode, the WAITI signal which is a power saving mode notifying signal is asserted to "1". As a result, the SELF requirement signal becomes "1" so that the SDRAM control sequencer 93 issues the SELF command to SDRAM 83 and SDRAM 83 enters the power saving mode.

Next, a procedure of returning to the normal operation mode from the power saving mode will be described. When an external trigger is input in response to the depression of a switch or the like of the information processing apparatus, the interruption controller 86 asserts a hardware interruption relative to CPU 81. Upon reception of the interruption, CPU 81 immediately returns to the normal operation mode and the power saving mode notifying signal (WAITI signal) is negated to "0".

The SELF requirement signal of the SDRAM controller 85 is therefore negated so that the SDRAM control sequencer 93 of the SDRAM controller 85 immediately issues a SELF EXIT command to SDRAM 83. This is realized by driving only the CS signal to "0" and all other signals (RAS signal, CAS signal, WE signal and CKE signal) to "2". With the above operations, SDRAM 83 returns to the normal operation mode.

CPU 81 returned to the normal operation mode outputs an interruption vector address and a command fetch cycle to the system bus 87 in order to immediately fetch the interruption handler command. Since SDRAM 83 is already in the normal operation mode, the SDRAM controller 85 can immediately read the requested command from SDRAM 83 and output it to the system bus 87.

As described above, according to the third embodiment of the invention, in the information processing apparatus having CPU 81 capable of transferring to the power saving mode from the normal operation mode and returning to the normal operation mode from the power saving mode and SDRAM 83 capable of transferring to the power saving mode from the normal operation mode and returning to the normal operation mode from the power saving mode, when the transfer of CPU 81 to the power saving mode is notified, CPU 81 makes settings so that SDRAM 83 is allowed to change the operation mode from the normal operation mode to the power saving mode, and the notification of the transfer to the power saving mode is received from a notifying means after SDRAM 83 is allowed to transfer to the power saving mode, SDRAM 83 is controlled to transfer to the power saving mode. Accordingly, the following advantageous effects can be obtained.

SDRAM 83 can operate normally when the WAITI command is fetched to transfer to the power saving mode, without using an expensive dedicated memory. Further, SDRAM 83 can fetch the interruption handler command to return to the normal operation mode. Since the interruption handler can be made always resident in a high speed RAM without wastefully using the cache field, a high performance can be maintained and a complicated software process is not necessary. It is therefore easy to configure a power saving type information processing apparatus which is not expensive and has a high interruption performance.

OTHER EMBODIMENTS

In the first to third embodiments of the invention, the type of the information processing apparatus is not specified. The invention is also applicable to various types of information processing apparatus such as a desk top personal computer, a note type personal computer, a portable information terminal, and a work station.

In the first to third embodiments of the invention, a single information processing apparatus is used. The invention is also applicable to a system having an information processing apparatus, an image forming apparatus such as a copier and a printer, and an image reading apparatus such as a scanner, respectively interconnected via a communication medium such as a network.

Figure 8:
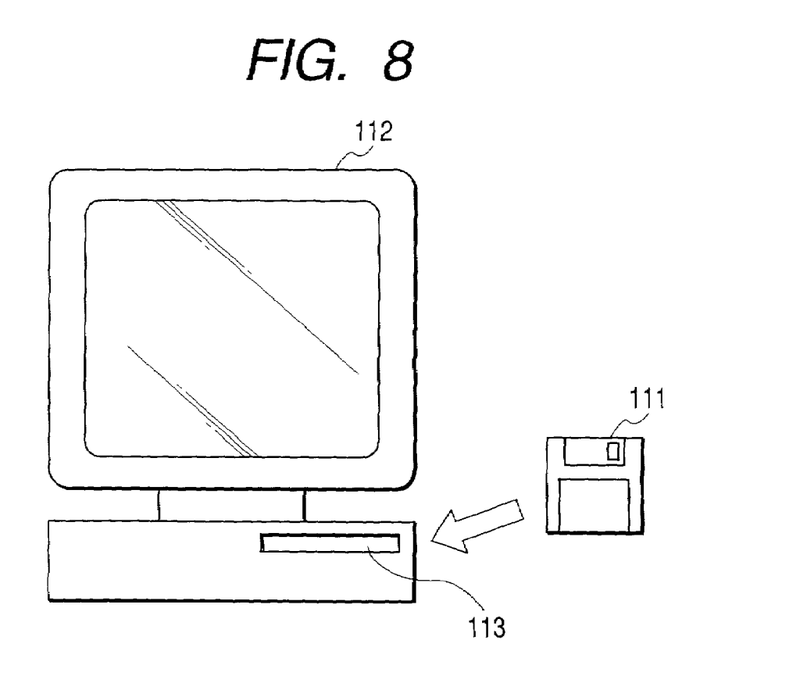
FIG. 8 is a diagram conceptually illustrating how a storage medium supplies an apparatus with a program and related data for executing a power saving mode transfer control method according to the invention.

FIG. 8 is a diagram conceptually illustrating how a storage medium supplies an apparatus with a program and related data for executing a power saving mode transfer control method according to the invention. The program and related data for executing the power saving mode transfer control method of the invention are supplied by inserting a storage medium 111 such as a FLOPPY TM disk and a CD-ROM into a storage medium insertion port 113 of an apparatus 112 such as a computer. Thereafter, the program and related data in the storage medium 111 are once installed in a hard disk and then loaded in a RAM, or directly loaded in a RAM without installing them in a hard disk. In this manner, the program and related data can be used.

In this case, when the program for executing the power saving mode transfer control method of this invention is to be executed by the information processing apparatus of the first to third embodiments, the program and related data are supplied to the information processing apparatus in the manner described with reference to FIG. 8, or loaded beforehand in the information processing apparatus.

Figure 7:
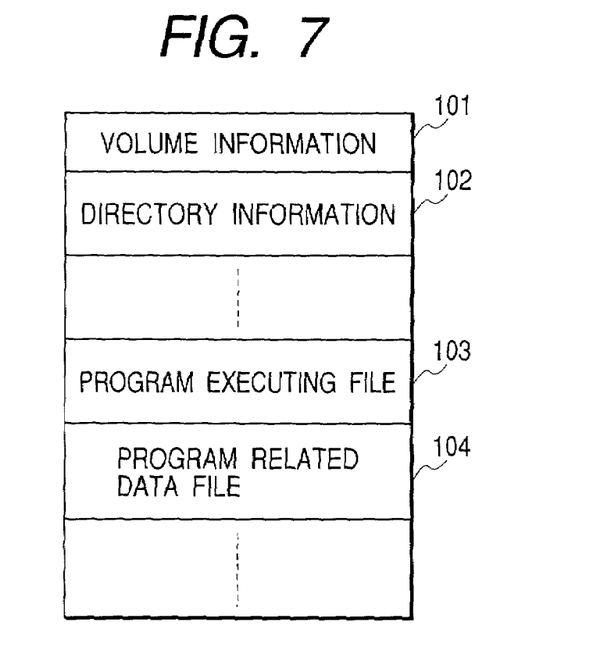
FIG. 7 is a diagram showing an example of the contents of a storage medium storing a program and related data for executing a power saving mode transfer control method according to the invention.

FIG. 7 is a diagram showing an example of the contents of a storage medium storing a program and related data for executing a power saving mode transfer control method of the invention. For example, the storage medium stores therein volume information 101, directory information 102, a program executing file 103, a program related data file 104 and the like. The program for executing the power saving mode transfer control method of the invention is constituted of program codes realizing the control procedure described with the first to third embodiments.

The invention is applicable to a system having a plurality of apparatuses or to a single apparatus. Obviously, a storage medium storing software program codes realizing the function of each embodiment described above may be supplied to a system or apparatus to make a computer (CPU or MPU) of the system or apparatus read the program codes stored in the storage medium.

In this case, the software program codes themselves read from the storage medium realize the embodiment function. Therefore, the storage medium storing the program codes constitutes the invention. The storage medium for storing such program codes may be a FLOPPY TM disk, a hard disk, an optical disk, a magneto optical disk, a CD-ROM, a CD-R, a magnetic tape, a nonvolatile memory card, a ROM or the like. The program codes may be downloaded via a network.

It is obvious that not only the computer reads and executes the program codes to realize the embodiment function but also the program codes are executed in cooperation with an OS running on the computer which OS performs a portion or the whole of actual processes to realize the embodiment function.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

What is claimed is:

1. An information processing apparatus comprising:
   processing means; and
   mode setting means for setting a mode of a memory,
   wherein said processing means sets said mode setting means to an enabled state in which said mode setting means is allowed to set the memory to a power saving mode, and issues an instruction fetch transfer for a power saving mode transfer instruction stored in the memory for setting said processing means to a power saving mode, and
   wherein said information processing apparatus further comprises detecting means for detecting the instruction fetch transfer for the power saving mode transfer instruction and outputting information in accordance with detection of the instruction fetch transfer for the power saving mode transfer instruction, and wherein said mode setting means sets the memory to the power saving mode in accordance with the information inputted from said detecting means while said mode setting means is in the enabled state.

2. An information processing apparatus according to claim 1, wherein if said processing means detects an interruption for returning to the normal operation mode from the power saving mode, said processing means returns a normal operation mode from the power saving mode and invalidates the information relating to the setting of said processing means to the powder saving mode, and
   wherein said mode setting mode sets the memory in a normal operation mode in accordance with invalidation of the information relating to the setting of said processing means to the power saving mode.

3. An information processing apparatus according to claim 1, wherein said mode setting means sets the memory to the power saving mode after an end of memory transfer in progress.

4. A power saving controlling method for a processor and a memory, the method comprising:
   an enabled state setting step of setting a memory controller for controlling the memory to an enabled state in which the memory controller is allowed to set the memory to a power saving mode;
   an issuing step issuing an instruction fetch transfer for a power saving mode transfer instruction stored in the memory for setting the processor to a power saving mode;
   a detecting step of detecting the instruction fetch transfer for the power saving mode transfer instruction; and
   an outputting step of outputting information in accordance with detection of the instruction fetch transfer for the power saving mode transfer instruction, and
   a power saving mode setting step of setting the memory to a power saving mode while the memory controller is in the enabled state in accordance with the information outputted in said detecting step while the memory controller is in the enabled state.

5. A power saving controlling method according to claim 4, further comprising:
   a returning step of returning the processor to a normal operation mode from the power saving mode in accordance with an interruption;
   an invalidating step of invalidating the information relating to the setting of the processor in the power saving mode in accordance with the returning to the normal operation mode of the processor; and
   a returning step of returning the memory to a normal operation mode in accordance with invalidation of the information relating to the setting of the processor to the power saving mode.

6. A power saving controlling method according to claim 4, wherein the memory is set to the power saving mode at said power saving mode setting step after an end of memory transfer in progress.

7. An information processing apparatus comprising:
   processing means;
   setting means for setting a mode of a memory; and
   detecting means for detecting a signal relating to reading a power saving mode transfer instruction from the memory for setting said processing means to a power saving mode, wherein said signal is detected on a bus to which said processing means is connected, and wherein said setting means sets the memory to the power saving mode in a case where said setting means is allowed to set the memory to the power saving mode and where said signal is detected by said detecting means.

8. An information processing apparatus according to claim 7, wherein the signal detected by said detecting means relates to an instruction fetch transfer for fetching the power saving mode transfer instruction from the memory for setting said processing means to the power saving mode.

9. An information processing apparatus according to claim 7, wherein said setting means sets the memory to the power saving mode after an end of memory transfer in progress in a case where said setting means is allowed to set the memory to the power saving mode and where the signal relating to reading the power saving mode transfer instruction from the memory for setting said processing means to the power saving mode is detected by said detecting means.

10. A power saving controlling method for a processor and a memory, the method comprising:

a detecting step of detecting a signal relating to reading a power saving mode transfer instruction from the memory for setting the processor to a power saving mode, wherein said signal is detected on a bus to which the processor is connected;

an allowing step of allowing a memory controller to set the memory to a power saving mode; and a setting step of setting the memory to the power saving mode in a case where the memory controller is allowed in said allowing step to set the memory to the power saving mode and where said signal is detected in said detecting step.

11. A power saving controlling method according to claim 10, wherein the signal detected in said detecting step relates to an instruction fetch transfer for fetching the power saving mode transfer instruction from the memory for setting the processor to the power saving mode.

12. A power saving controlling method according to claim 10, wherein the memory is set in said setting step to the power saving mode saving mode after an end of memory transfer in progress in a case where the memory controller is allowed in said allowing step to set the memory to the power saving mode and where the signal relating to reading the power saving mode transfer instruction from the memory for setting the processor to the power saving mode is detected in said detecting step.

* * * * *

UNITED STATES PATENT AND TRADEMARK OFFICE
CERTIFICATE OF CORRECTION

PATENT NO. : 7,139,919 B2 Page 1 of 1
APPLICATION NO. : 09/931887
DATED : November 21, 2006
INVENTOR(S) : Shinji Shiraga It is certified that error appears in the above-identified patent and that said Letters Patent is hereby corrected as shown below:

<u>COLUMN 14</u>:
Line 18, "mode saving" should be deleted.

Signed and Sealed this

Fifth Day of June, 2007

JON W. DUDAS
*Director of the United States Patent and Trademark Office*